United States Patent
Blatter et al.

(10) Patent No.: US 7,466,047 B2
(45) Date of Patent: Dec. 16, 2008

(54) TURBOGENERATOR AND METHOD OF USE

(75) Inventors: Richard Blatter, Schaffhausen (CH); Yves Sabater, Evette-Salber (FR); Michel Verrier, Essert (FR)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/386,680

(22) Filed: Mar. 13, 2003

(65) Prior Publication Data
US 2003/0209948 A1    Nov. 13, 2003

(30) Foreign Application Priority Data
Mar. 13, 2002   (CH)   ................. 0442/2002

(51) Int. Cl.
*H02K 11/00*   (2006.01)
(52) U.S. Cl. ........................................ 310/71
(58) Field of Classification Search .............. 310/71, 310/179; 322/89, 46
See application file for complete search history.

(56) References Cited

U.S. PATENT DOCUMENTS 3,930,175 A * 12/1975 Chirgwin .................. 310/160
4,866,316 A * 9/1989 Humphries et al. .......... 310/71
5,197,907 A    3/1993 Hurtgen
6,538,339 B2 * 3/2003 Krizek et al. ............... 290/1 A

FOREIGN PATENT DOCUMENTS

DE   89 06 106   9/1989
FR   2 688 635   9/1993

OTHER PUBLICATIONS

ABB Power Generation, "Air-Cooled Turbogenerators 18 to 239 MVA Series WX and WY", Publication No. CH-KW 2508 92 E, pp. 1-12, Jan. 1992.
Search Report, prepared by the European Patent Office, for Swiss Appl. No. CH 4422002, issued Jul. 4, 2002.

* cited by examiner

*Primary Examiner*—Nguyen N Hanh
(74) *Attorney, Agent, or Firm*—Cermak Kenealy & Vaidya LLP; Adam J. Cermak

(57) ABSTRACT

A turbogenerator (20) comprises a rotor (13) and a stator (14), which stator (14) has a polyphase winding, the terminals of which are arranged as generator terminals (U1, . . . ,W2) in a terminal arrangement (25) at the turbogenerator (20) to be connected to a neutral point (26) and to bus bar connections (S1, . . . ,S3). The terminal arrangement (25) is configured such that the phase sequence can be changed in a simple way by changing the connecting scheme at the terminal arrangement (25).

8 Claims, 4 Drawing Sheets

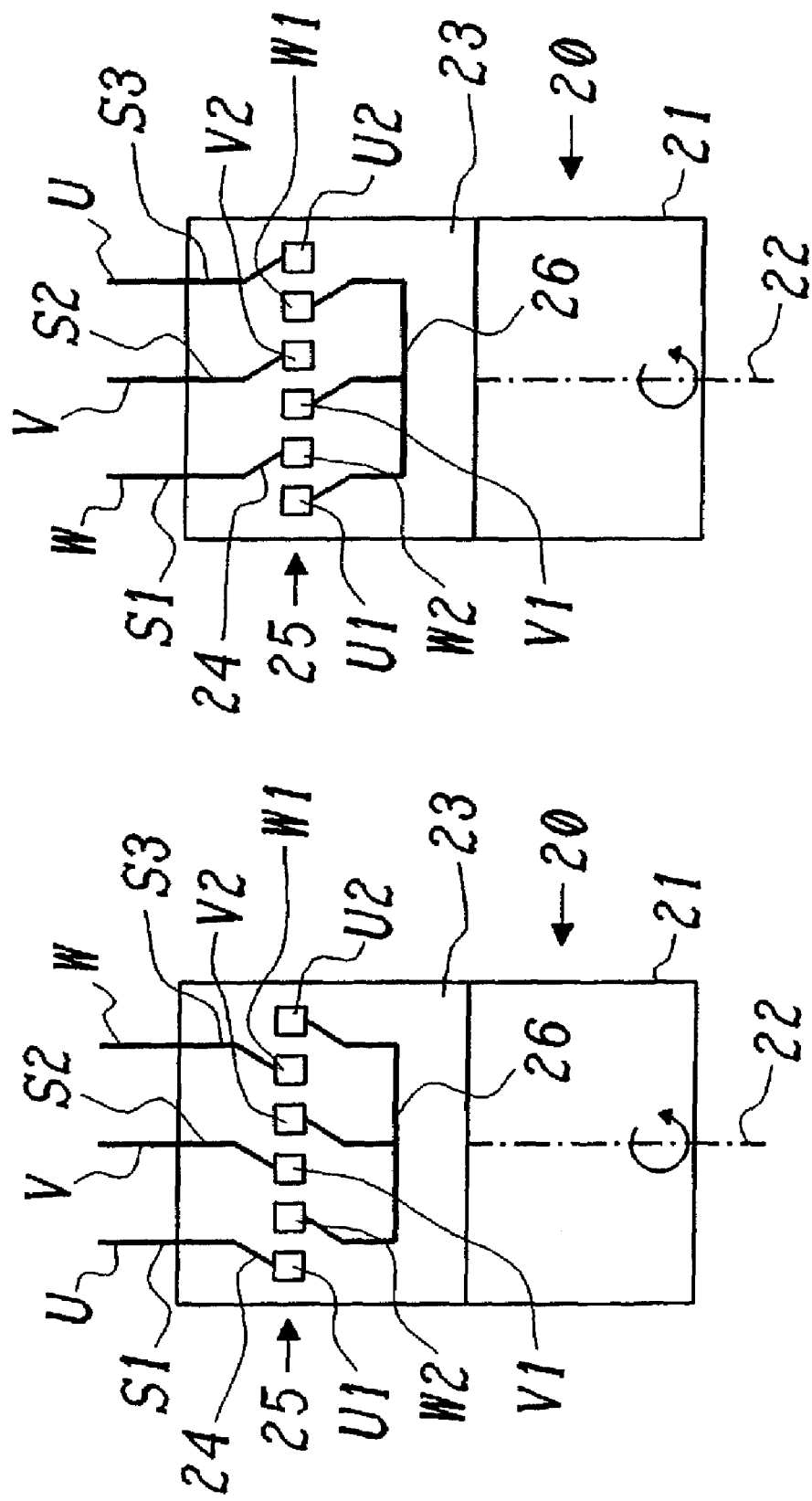

TURBOGENERATOR AND METHOD OF USE

This application claims priority under 35 U.S.C. § 119 to Swiss patent application number 2002 0442/02, filed Mar. 13, 2002, the entirety of which is incorporated by reference herein.

FIELD OF INVENTION

The present invention is relevant to the field of power generation and relates to a turbogenerator.

PRIOR ART

A turbogenerator of the aforementioned kind is shown and described in publication no. CH-KW 250892 E of ABB Asea Brown Boveri AG (Switzerland).

The generator terminals of a turbogenerator form the connecting point between the stator winding, the bus bars leading to the grid and the neutral point. In prior art turbogenerators as shown in simplified in form in the aforementioned publication or in FIGS. 1 and 2 herein, generator terminals are arranged in groups. In the turbogenerator 10 of FIG. 1, comprising within a machine housing 11 a rotor 13 that rotates about an axis 12 and a stator 14 encircling the rotor 13, the stator winding (not shown) is configured for three phases U, V and W. Each phase is assigned to two generator terminals (U1, U2, . . . , W1, W2). The generator terminals (U1, . . . W2) are arranged in two groups (U1, V1, W1 and U2, V2, W2) within a terminal arrangement 15, in which one of the groups is provided for connection to the neutral point and the other group is provided for connection to the bus bars. In FIG. 1 the generator terminals (U1, . . . , W2) are extended downwardly, as is also shown in the aforementioned publication. However, it is also known, as shown in FIG. 2, to extend upwardly the generator terminals of a turbogenerator 10' in a comparable, grouped terminal arrangement 15' into a superimposed MV cubicle 16.

The result of this grouped arrangement is a strict correlation between the direction of rotation of the rotor 13 of the turbogenerator 10 and 10', and the phase rotation of the grid. For this reason when assembling a new plant a determination of the phase sequence of the plant is required at a very early stage of construction, or the direction of rotation must be later adjusted within the bus bar arrangement on the grid side. However, this solution is costly and requires additional time and space.

BRIEF DESCRIPTION OF THE INVENTION

Thus, the object of the present invention is to provide a turbogenerator that is easily adapted to different phase sequence requirements when still in the construction phase.

A principle of the invention is seen in configuring the arrangement of generator terminals so that the phase sequence can be changed simply through a change in the connecting scheme at the terminal arrangement.

Preferably, this is done in a turbogenerator in which each phase is assigned to a first and a second generator terminal, each of which corresponds to a first and second end of the associated stator winding, the result being that the first and second generator terminals within the terminal arrangement are disposed consecutively in a continuous, alternating series, and in particular in which the first generator terminals within the series are arranged in ascending order and the second generator terminals are arranged in descending order. This allows the phase sequence to be changed at any time and by particularly simple means with minimal changes to the connecting sequence, without the need for further changes/adaptations to the turbogenerator itself.

It is made particularly simple, for purposes of changing the connecting scheme, by providing connecting pieces, which can be rearranged to change the connection of the bus bars and the neutral point with the generator terminals.

BRIEF DESCRIPTION OF THE DRAWINGS

Preferred embodiments of the present invention are described in greater detail with reference to the drawings, in which:

FIG. 5 is a schematic representation of a turbogenerator according to a second embodiment of the present invention having an alternating terminal arrangement and a first connecting scheme;

FIG. 6 is the embodiment of FIG. 5 with a second connecting scheme;

DETAILED DESCRIPTION OF EXEMPLARY EMBODIMENTS OF THE INVENTION

Figure 1:
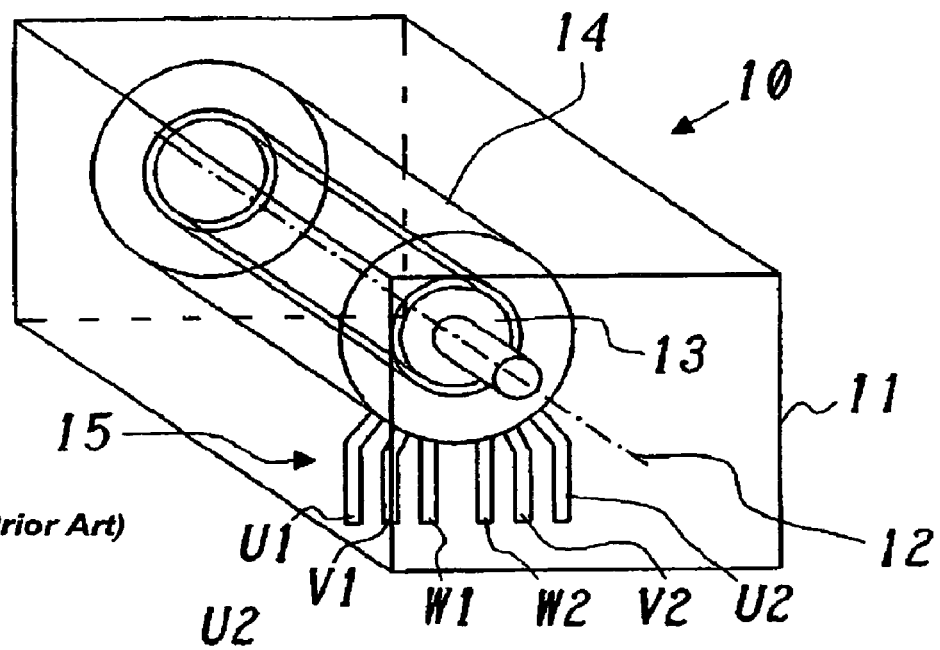
FIG. 1 is a highly schematic representation of a first turbogenerator with terminals arranged in groups in accordance with the prior art.
Figure 2:
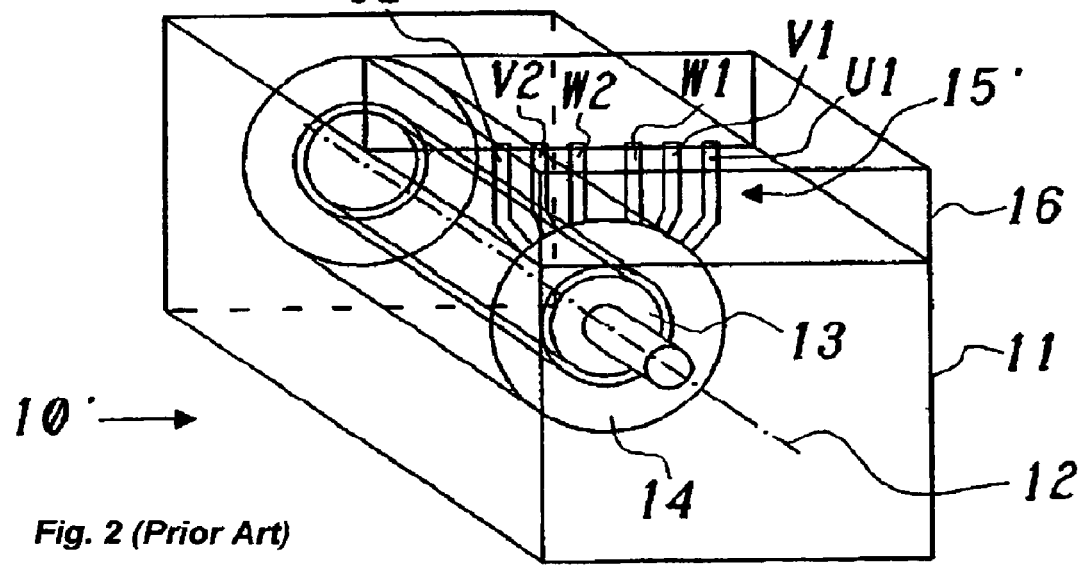
FIG. 2 is a highly schematic representation of a second turbogenerator with terminals arranged in groups in accordance with the prior art (additional connecting terminal positions such as lateral, frontal, etc, are also known)
Figure 3:
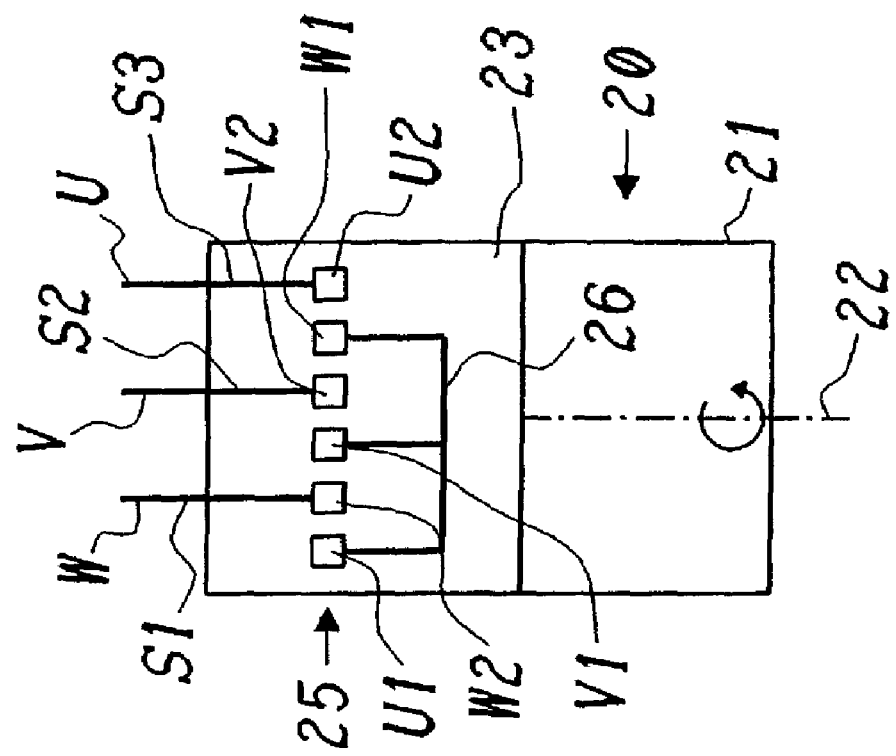
FIG. 3 is a schematic representation of a turbogenerator according to a first embodiment of the present invention having an alternating terminal arrangement and a first connecting scheme.

FIG. 3 shows a schematic plan view of a turbogenerator 20 according to a first embodiment of the present invention. The turbogenerator 20 comprises an arrangement within a machine housing 21 of a rotor 13 and a stator 14, as is also shown in FIG. 1 or 2. The rotor rotates in a given direction about an axis 22. Above the plant a terminal arrangement 25 of generator terminals (connecting terminals) U1, . . . , W2 is disposed within a MV cubicle 23, in which the first and second generator terminals U1, V1, W1 and U2, V2, W2 are arranged consecutively in alternating series. Said first generator terminals follow an ascending line U→V→W, while said second generator terminals follow a descending line W→V→U. In the connecting scheme illustrated in FIG. 3, the neutral point 26 is connected to the second generator terminals W2, V2, U2, and the bus bar connections leading to the grid (generator bus bar) S1 . . . ,S3 are connected to the generator terminals U1, V1 and W1. This produces a "normal" phase sequence U,V,W.

Figure 4:
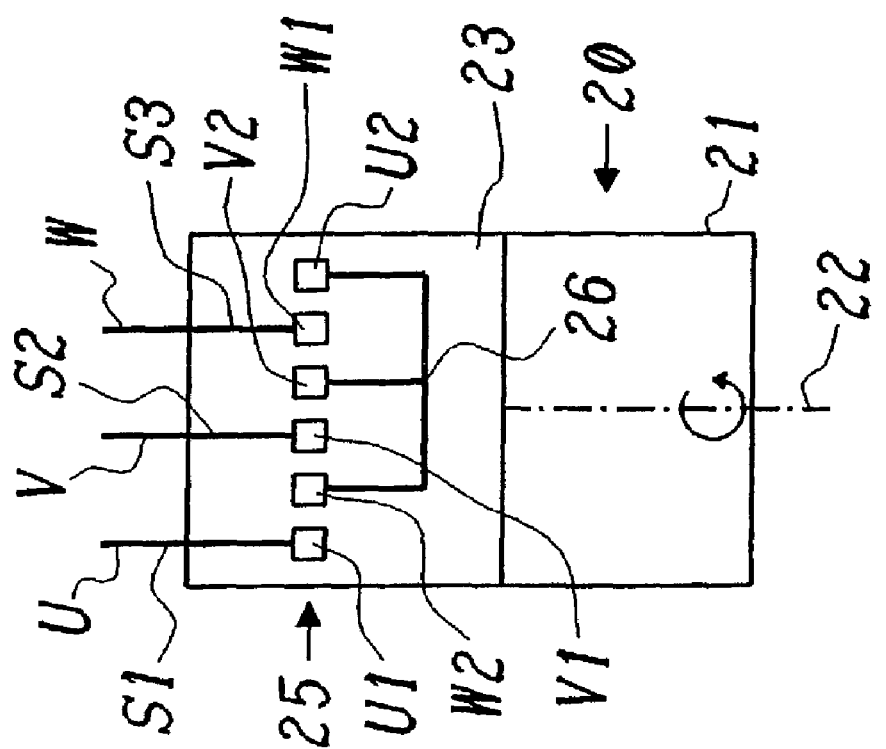
FIG. 4 is the embodiment of FIG. 3 with a second connecting scheme.

In the event of a change in the phase sequence, this may be accomplished by a simple change in the connecting scheme, as is shown in FIG. 4: the neutral point 26 is then connected to said first generator terminals U1, V1, W1 while the bus bar connections S1, . . . S3 are connected to said second generator terminals W2, V2, U2. Maintaining the same direction of rotation of the rotor in the process results in a reversal of the phase sequence from U→V→W to W→V→U. The change of connecting scheme of FIG. 3 according to FIG. 4 is simple enough, but requires in addition the bus bar connections S1 . . . ,S3 and connecting lines to be displaced laterally relative to the neutral point 26.

Further simplification is achieved in this respect when, as per FIGS. 5 and 6, the bus bar connections S1, . . . S3 and lines connecting to the neutral point 26 are oriented symmetrically relative to the terminal arrangement 25, and when the connecting scheme is changed by analogy with FIGS. 3 and 4 by merely rearranging (pivoting) short connecting pieces 24 from the generator terminals U1, . . . ,W2 to the connecting lines. Thus, achieved by simple means is a plant that is highly flexible and easy to operate.

Figure 8:
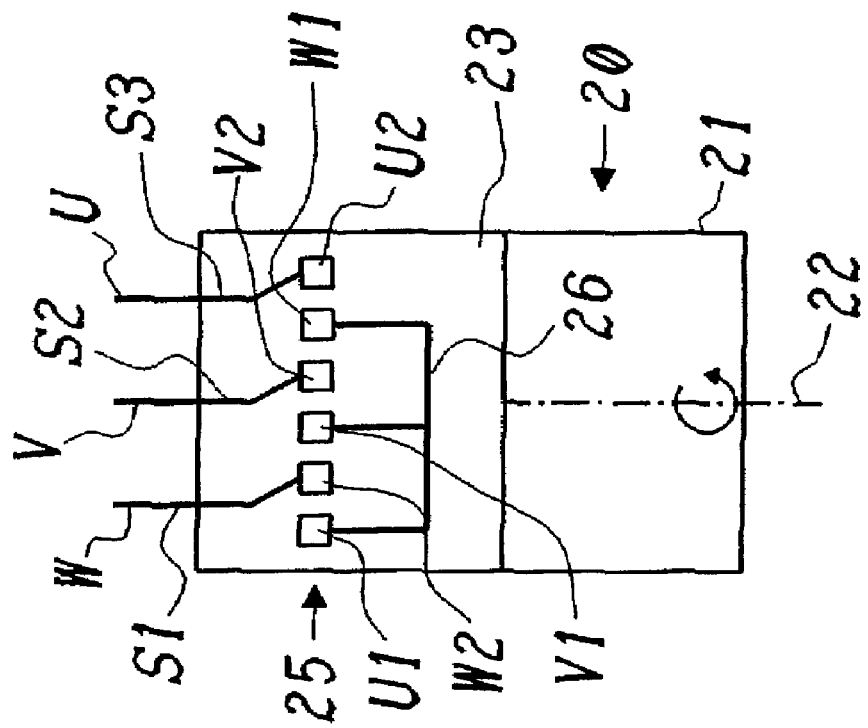
FIG. 8 is a mixed form embodiment derived from the examples according to FIGS. 4 and 6.
Figure 7:
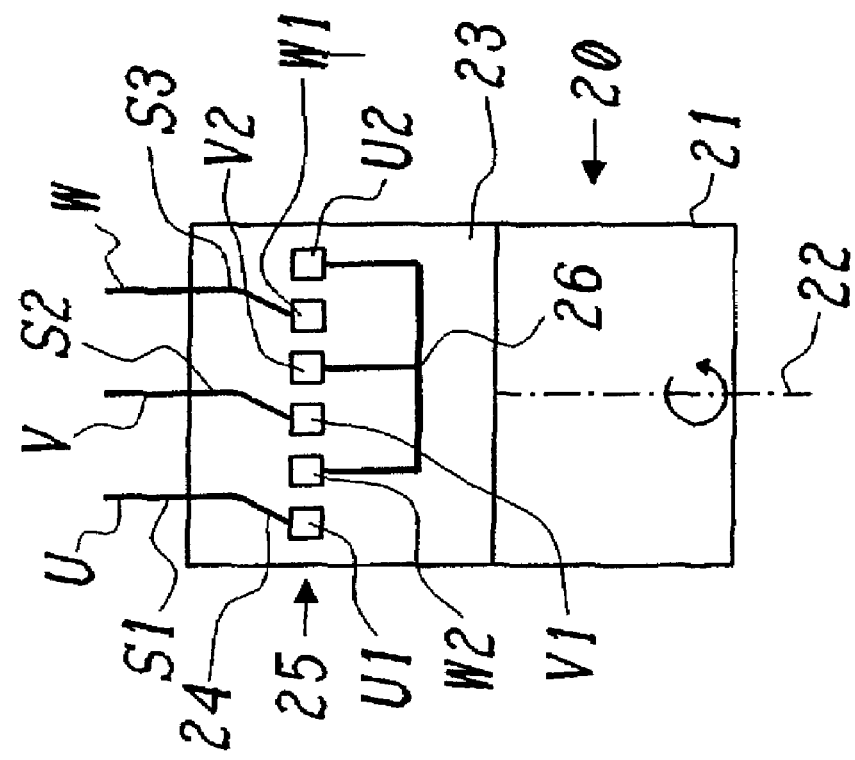
FIG. 7 is a mixed form embodiment derived from the examples according to FIGS. 3 and 5.

FIGS. 7 and 8 each show a mixed variant in which the neutral point 26 is displaced laterally and only the bus bars (bus bar connections S1, . . . S3) are arranged symmetrically relative to the terminal arrangement 25 and adapted by three connecting pieces 24 to the corresponding desired direction of rotation.

In this arrangement, terminal arrangement 25 may be mounted at any point on the turbogenerator 20. Similarly, the bus bar connections S1, . . . ,S3 may be connected in any axial direction.

LIST OF REFERENCE NUMERALS 10,10',20 turbogenerator
11,21 machine housing
12,22 axis
13 rotor
14 stator
15,15',25 terminal arrangement
16,23 MV cubicle
24 connecting piece
26 neutral point
U1, . . . W2 generator terminal
U,V,W phase
S1, . . . ,S3 bus bar connection

We claim:

1. A turbogenerator comprising:

a rotor and a stator, which stator has a polyphase winding including terminals, the individual terminals of which are arranged as generator terminals in a terminal arrangement at the turbogenerator to be connected to a neutral point and to bus bar connections;

wherein the terminal arrangement is pivotable at the neutral point and at the terminals such that the phase sequence can be changed after installation by changing the connecting scheme at the terminal arrangement;

wherein each phase is assigned to a first generator terminal and to a second generator terminal, each of which corresponds to a first end and to a second end of the associated stator winding; and wherein said first and second generator terminals are arranged within the terminal arrangement consecutively in a continuous, alternating series.

2. A turbogenerator according to claim 1, wherein said first generator terminals are arranged within the series in ascending order and said second generator terminals are arranged in descending order.

3. A turbogenerator according to claim 1, further comprising short connecting pieces for changing the connecting scheme, by which rearrangement of the connection of the bus bar connections and the neutral point with the generator terminals can be changed.

4. A turbogenerator according to claim 3, wherein the bus bar connections are arranged symmetrically relative to the terminal arrangement and the connecting pieces are provided on the side of the terminal arrangement facing the grid.

5. A turbogenerator according to claim 4, wherein the neutral point is laterally displaced.

6. A turbogenerator according to claim 1, wherein the terminal arrangement is configured and arranged to be mounted at any location on the turbogenerator.

7. A turbogenerator according to claim 1, wherein the bus bar connections are configured and arranged to be connected in any axial direction.

8. A method for changing the phase sequence of a turbogenerator, the turbogenerator including a rotor and a stator, which stator has a polyphase winding including terminals, the individual terminals of which are arranged as generator terminals in a terminal arrangement at the turbo generator to be connected to a neutral point and to bus bar connections, wherein each phase is assigned to a first generator terminal and to a second generator terminal, each of which corresponds to a first end and to a second end of the associated stator winding, and wherein said first and second generator terminals are arranged within the terminal arrangement consecutively in a continuous, alternating series, the method comprising:

changing the connecting scheme at the terminal arrangement after installation by pivoting the neutral point and terminals.

* * * * *